(12) United States Patent  (10) Patent No.: US 7,275,711 B1
Flanigan  (45) Date of Patent: Oct. 2, 2007

(54) GAS-POWERED TIP-JET-DRIVEN COMPOUND VTOL AIRCRAFT

(76) Inventor: Kenneth Warren Flanigan, 12385 6th St., 521, Yucaipa, CA (US) 92399

( * ) Notice: Subject to any disclaimer, the term of this patent is extended or adjusted under 35 U.S.C. 154(b) by 0 days.

(21) Appl. No.: 11/062,537

(22) Filed: Feb. 22, 2005

Related U.S. Application Data

(60) Provisional application No. 60/547,025, filed on Feb. 23, 2004.

(51) Int. Cl.
*B64C 27/18* (2006.01)

(52) U.S. Cl. .................................. 244/17.11; 244/17.13

(58) Field of Classification Search ..................... None
See application file for complete search history.

(56) References Cited

U.S. PATENT DOCUMENTS

| | | | |
|---|---|---|---|
| 3,155,341 A | 11/1964 | Girard | |
| 3,159,360 A | 12/1964 | Ryan et al. | |
| 3,417,825 A | 12/1968 | Ramme | |
| 3,635,426 A | 1/1972 | Stanley | |
| 3,792,827 A | 2/1974 | Girard | |
| 4,589,611 A | 5/1986 | Ramme | |
| 4,711,415 A * | 12/1987 | Binden | 244/17.19 |
| 4,730,795 A | 3/1988 | David | |
| 5,149,014 A | 9/1992 | Faller | |
| 5,174,523 A | 12/1992 | Balmford | |
| 5,727,754 A | 3/1998 | Carter, Jr. | |
| 5,984,635 A | 11/1999 | Keller | |
| 6,513,752 B2 | 2/2003 | Carter, Jr. | |
| 6,789,764 B2 * | 9/2004 | Bass et al. | 244/10 |
| 6,885,917 B2 * | 4/2005 | Osder et al. | 701/3 |
| 6,986,642 B2 * | 1/2006 | Carter | 416/139 |
| 2005/0151001 A1 * | 7/2005 | Loper | 244/6 |

OTHER PUBLICATIONS

Mal Halcomb, copyright Airpower Magazine, Mar. 1990, article, Vertical Lift, German Helicopter Dev. Through the End of WW II.
R. Connor & R. E. Lee, McDonnell XV-1 Convertiplane, copyright 1998-2000 National Air & Space Museum, Smithsonian Institution.
Jim Wilson; Battle of the X-Planes, Popular Mechanics, May 13, 2003 http://www.popularmechanics.com/science/aviation/1280701. html?c=y&page=5.

* cited by examiner

*Primary Examiner*—Timothy D. Collins

(57) ABSTRACT

A compound Vertical TakeOff and Landing (VTOL) aircraft. In a specific embodiment, the VTOL aircraft includes a gas-powered tip-jet driven rotary-wing and a fixed-wing that is capable of providing necessary lift to the aircraft during certain forward-flight regimes so that lift from the rotary-wing is not required. This enables slowing of the rotor, thereby reducing drag during forward flight and enabling flight above and below mu-1. Valves and accompanying ducting are employed to control compressed gas flow to the rotary-wing. Various reaction jets are employed for attitude control during VTOL and transition operations. The aircraft further includes a jet exhaust nozzle to provide forward thrust to facilitate forward flight.

15 Claims, 10 Drawing Sheets

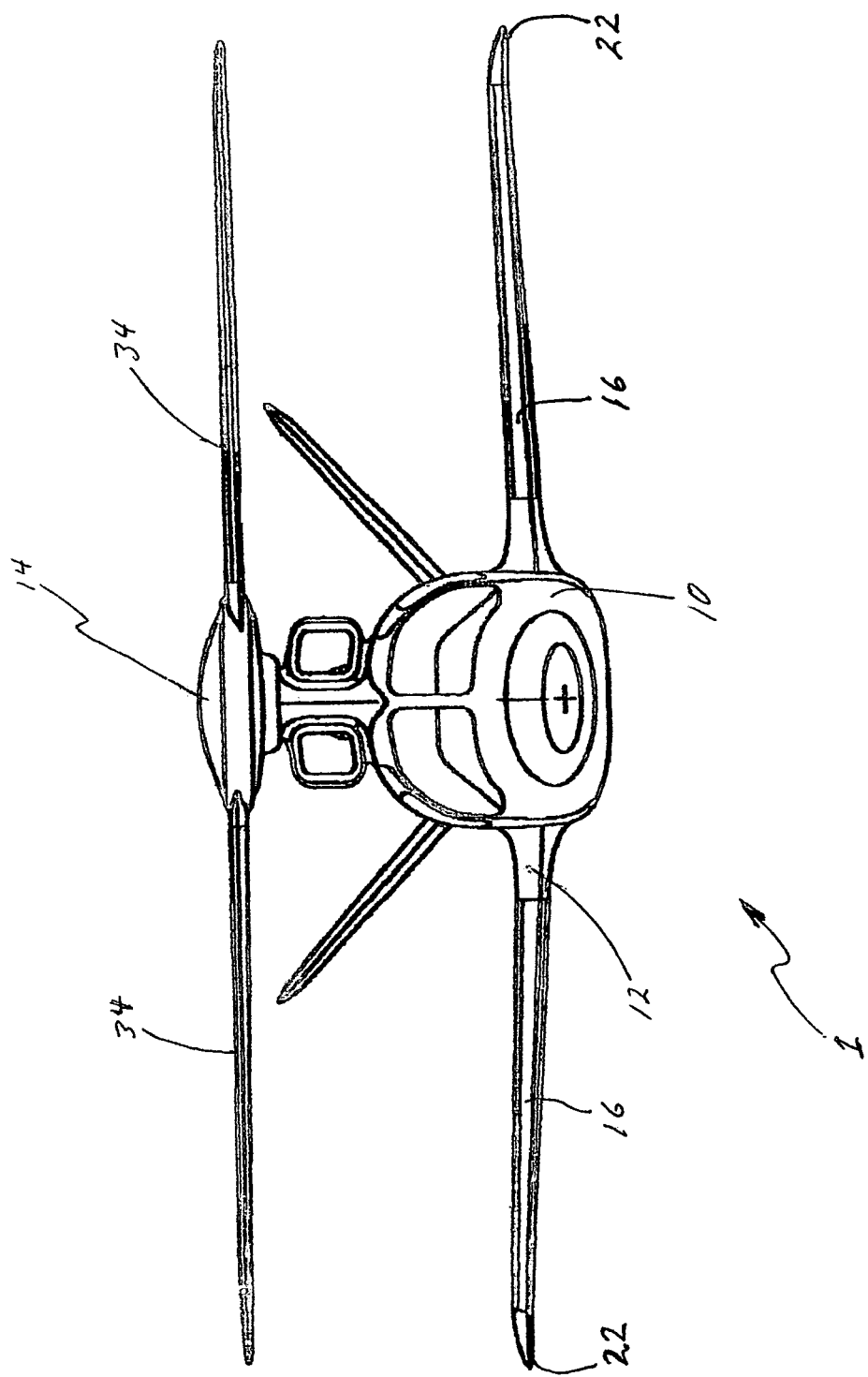

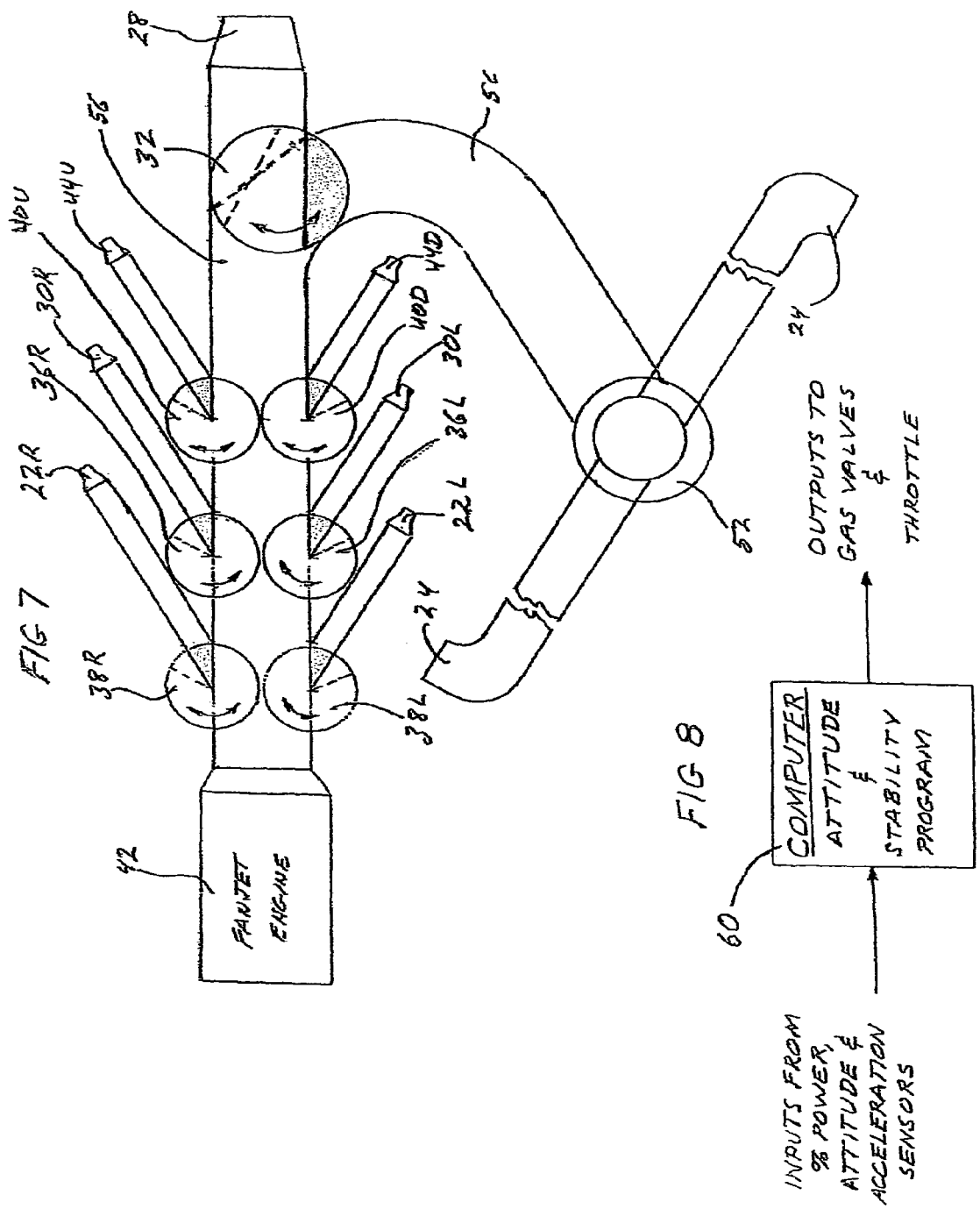

GAS-POWERED TIP-JET-DRIVEN COMPOUND VTOL AIRCRAFT

CROSS-REFERENCE TO RELATED APPLICATION

This application claims the benefit of U.S. Provisional Patent Application Ser. No. 60/547,025, filed on Feb. 23, 2004, by the present inventor.

BACKGROUND OF THE INVENTION

Field of Invention

This invention relates to compound Vertical TakeOff and Landing (VTOL) aircraft utilizing a gas driven rotor.

BACKGROUND OF THE INVENTION

In around the year 100 BC, Hero of Alexandria discovered the reaction engine with his aeolipile experiment. Then the Wright brothers introduced powered flight in 1903, and in 1910 Henri Marie Coanda married the two together to fly the first jet-propelled airplane. In 1955 the McDonnell XV-1 tip-jet autogyro made its record-breaking flight.

With man's desire for aircraft that would use less runway coincident with flying faster, safer and easier handling, he has created many different types of VTOL, SVTOL or compound aircraft including helicopters, autogyros, tilt-rotors, tip-jets, convertiplanes, gyrodynes, contra-rotators and direct lift Harrier types.

The field of compound aircraft can be broken down into three broad categories relative to their rotors:

4. Shaft driven rotors, which employ the use of high-maintenance mechanical drive systems, are often massive, complex, expensive, and inefficient. They cause accompanying aircraft to be expensive, have poor economy of operation and maintenance, poor empty-weight fraction, poor range, poor performance, and still other factors that will be discussed in more detail below.

Typical of the shaft driven compound aircraft is the aircraft disclosed in U.S. Pat. No. 3,155,341, by P. F. Girard. Another is disclosed in U.S. Pat. No. 5,174,523, which discusses "engine shaft power output control." Both include heavy, expensive gearboxes and attendant shafting. Both have fixed wings, but neither speaks of providing any means of transiting the mu-1 barrier. (The term mu is the ratio of the forward velocity of the aircraft relative to the tip velocity of the rotor.) Another related U.S. Pat. No. 4,730,795 describes a heavy, complex co-axial shaft transmission that drives gyrating blades. Another of the shaft-driven type is the Lockheed AH-56A Cheyenne. These shaft-driven aircraft generally require an anti-torque device.

5. Autogyro and gyroplane type aircraft normally lack means of rotor drive while airborne. They usually require a short takeoff or a jump takeoff if the rotor is powered up on the ground. The big disadvantages of the autogyro types are the lack of hovering ability, agility, responsiveness, room for error, and limited freedom of choice in VTOL maneuvers. This group is tricky and unforgiving to land, as rotor rpm can be difficult to manage. U.S. Pat. No. 5,727,754, discusses a gyroplane commonly known as the CarterCopter, which due to blade weights can store enough kinetic energy in the rotor to enable the craft to make a fifty-foot high jump takeoff.

Another recent U.S. Pat. No. 6,513,752, discusses an aircraft that is classified as a gyro-type of aircraft. The aircraft has a transmission, clutch and drive train to power the rotor when needed. This adds more weight and expense to the aircraft, and, in addition, necessitates an anti-torque device.

6. A third category includes VTOL aircraft capable of flying vertically via gas-powered tip-jet-driven rotors. The McDonnell XV-1 has a tip-jet driven rotor, and although it operated as an autogyro in forward flight, it had exceeded contemporary rotary-wing speed records by hitting 200 mph. It did not have the capability to exceed mu-1, however. This type of craft does not require an anti-torque device. These aircraft have the advantages of a powered rotor but need not have a heavy, massive drive train, transmission, clutch, rotor head and blade root sections.

We will confine our further remarks here to category 3 above: VTOL aircraft capable of flying vertically via gas-powered tip-jet-driven rotors.

U.S. Pat. No. 4,589,611 discloses a contra-rotating aircraft with a massive rotor head and extra lifting hardware to slow the aircraft. The lifting hardware makes the aircraft inefficient in forward flight.

U.S. Pat. No. 3,635,426 discloses an aircraft that employs high rotor rpm during high-speed flight. With no fixed wing, this aircraft's forward speed is limited by advancing tip speed and/or retreating blade stall.

U.S. Pat. No. 5,984,635 discloses an aircraft with at least six blades around the periphery of a large circular plenum that acts as a wing in forward flight. Six or more blades add unnecessary drag in forward flight. The plenum will not be as efficient as a high aspect ratio wing, and it will act as a large reservoir for the compressed gas that will slow the response time when the pilot calls for increased or decreased rotor rpm.

The McDonnell XV-1 employs a conventional helicopter cyclic controlled rotor with all its complexity. The accompanying wing does not totally sustain the aircraft even at top speed. The rotor is propelled by hot tip-jets—that is, fuel is fed to the tip-jets in order to obtain the required thrust. Forward thrust is obtained by the cyclic action of the rotor until the aircraft was largely sustained, but not entirely, by the wing at which time power was transferred from the tip-jet gas compressors to the pusher propeller. In addition, the aircraft flies as an autogyro when in cruise flight. Furthermore, the McDonnell XV-1 derives approximately 15 percent of its lift from the rotor when flying at its maximum speed. It achieves this by putting the rotor in autogyro mode. It did not possess the technology to exceed mu-1, which would have been necessary for it to fly faster than 200 mph. However, it did obtain a mu of 0.95, which has yet to be exceeded.

SUMMARY OF THE INVENTION

The aircraft of the preferred embodiment was designed from the ground up to exceed mu-1 and is capable of flying at mu-2 and more. Its design does not require a shaft-driven rotor with all of its attendant disadvantages, yet, unlike the autogyro, the rotor receives sufficient power during forward flight to keep it at an RPM determined by its rigidity commensurate with minimum drag. This is done via a computer, and, also, the pilot is in full direct control.

Unlike the cyclic rotor control and the abrupt change from rotor to propeller power used on the McDonnell XV-1 to gain forward speed, soon after leaving the ground certain embodiments of the present invention gradually redirect some of the compressed gas from the rotor tip-jets to a jet exhaust nozzle to provide forward thrust. Compressed gas is still provided to the tip-jets for climbing prior to aircraft forward speed being sufficient for the wings to sustain the aircraft. This unique design provides a very smooth transition to forward flight because there is no abrupt change from one mode to another. Rather, the main gas valve gradually transfers thrust from the tip-jets to the jet exhaust.

By using a compressed gas driven rotor, certain embodiments of the present invention implement multiple-flow thrust generators, which can provide high thrust augmentation ratios. Coupled with a small fixed wing and a means of managing the rotor through many dynamic effects as the rotor passes into mu-1 and beyond, certain embodiments of the present invention can achieve very high speeds for an aircraft with a rotary-wing. The preferred embodiment of the present invention represents a compound VTOL aircraft that is faster, much lighter, much less costly, much less complex and more efficient than is presently known in the art.

BRIEF DESCRIPTION OF THE DRAWINGS

FIG. 6 is a front view of the aircraft of FIG. 1 shown in fixed-wing flight mode.

FIG. 7 is a schematic representation of hot gas exhaust valves used to divert compressed gas to the jet exhaust nozzle, rotary-wing tip-jets and reaction jets.

FIG. 8 is a schematic representation of an attitude and stability computer.

DETAILED DESCRIPTION OF PREFERRED EMBODIMENT

Tip-jet driven rotors can be termed multiple-flow thrust generators. J. V. Foa in *Elements of Flight Propulsion* (published by Wiley and Sons) defines a multiple-flow thrust generator as "one in which various aggregates of the working fluid undergo different cycles." (He refers here to different thermal cycles.) Examples are: a) turbofans; b) turboprops; c) ducted engines; and d) tip-jet-driven propellers and rotors.

Of all of the various means of applying direct lift to a craft, none can compete with a well designed multiple-flow thrust generator in terms of energy applied. This is due to a little understood fact that this type of thrust generator provides "thrust-augmentation." Foa defines thrust-augmentation as "an increase in thrust at no extra cost in energy input." He remarks that a jet-driven propeller provides one of the most striking illustrations of the thrust-augmentation.

By way of example, a quarter-scale model (rotor diameter of 5.65 feet) of a tip-jet rotor system was built. One test at 6 degrees pitch on each of three blades turning at 2700 rpm produced a thrust-augmentation ratio of 16.8. This means that it would take a mere 13.1 lbs of thrust to hover a quarter-scale model aircraft weighing 220 pounds. Using this principle produces the highly efficient, high performance aircraft described in this embodiment.

Another object of this invention is to operate the tip-jet driven rotor in its most efficient zone of operation when in VTOL operations. Tests with the quarter-scale model showed that the rotor's most efficient zone of operation is when the tip velocity is around 800 feet per second. The faster the rotor is driven up to the point where the tip enters the sonic transition zone, the more efficient the system becomes due to the centrifugal action on the gas mass inside the rotor blades. Also, the heavier the load on the rotor system, the higher the operating gas pressure of the system, the denser the gas, the more mass being acted upon by centrifugal force.

Figure 11:
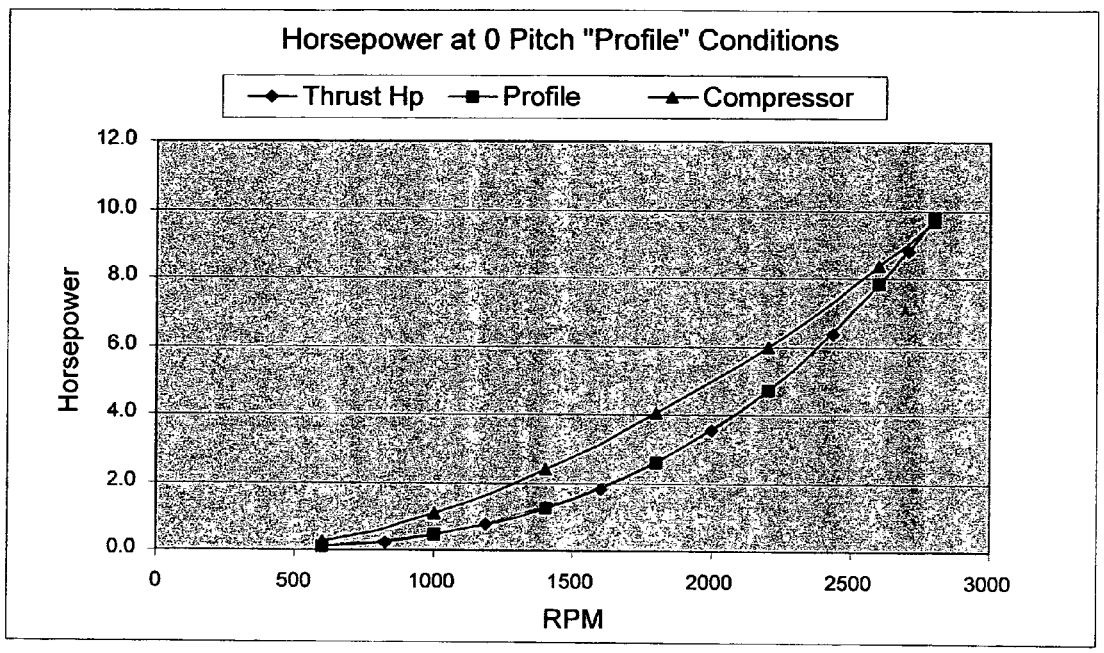
FIG. 11 is a chart illustrating compressor horsepower and thrust horsepower versus rotor rpm when the rotor is at zero-pitch and no-load.

FIG. 11 is a chart that shows the relationship between rotor rpm and various kinds of horsepowers at zero-pitch, no-load conditions. Thrust horsepower was calculated from the standard equation: rpm×torque divided by 5250. Profile and compressor horsepower were also calculated using standard equations. It can be seen that compressor horsepower starts out being less efficient, and then at 2000 rpm, begins increasing in efficiency until it becomes more efficient than the others at 2750 rpm. The rotor rpm of 2750 equates to a tip velocity of 813 fps for this particular rotor.

Figure 12:
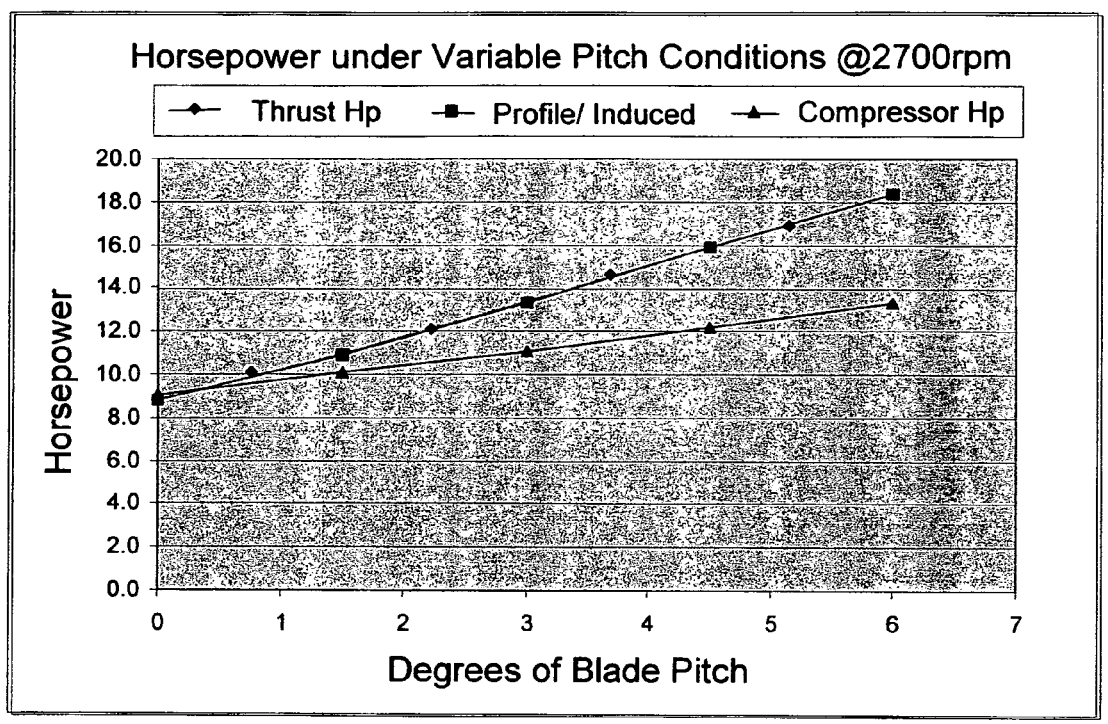
FIG. 12 is chart illustrating compressor horsepower and thrust horsepower versus rotor blade pitch angle when the rotor rpm is set at 2700 rpm.

FIG. 12 shows the relationship between the same three kinds of horsepower (except that we include induced hp with profile hp here) and degrees of blade pitch at a set 2700 rpm. Notice, as pointed out above concerning load, that the larger the pitch, the more efficient the system becomes.

An object of this invention is to teach a method by which compound aircraft can be made faster, much lighter, much less costly, much less complex and more efficient than is presently known in the art.

The unique design of this aircraft eliminates the need for a conventional rotor with cyclic-stick control. There also is no need for articulating, hinged blades. All of this complexity and extra weight is eliminated. One embodiment may use a conventional two-bladed flapped, rigid rotor design. Another embodiment may use a two-bladed flex-beam rigid rotor design. Yet another may use a new trailing-edge flap system actuated by embedded smart materials. All are controlled by a computer, and perform the following functions:

d) Compensate for rotor instability due to variations in free-stream air velocity as the rotor turns within the advancing air stream.

e) Compensate for variations in lift across the breadth of the rotor disc due to free air-stream velocity being much different at the blade roots than at the blade tips.

f) Compensate for flow reversal across various sections of the retreating blade as the rotor blades transition mu-1 and beyond.

An objective of the preferred embodiment, integral to high-speed forward flight, is to have an efficient wing that will fully sustain the aircraft above about 100 knots. This would allow the rotor to be fully unloaded and slowed down so as to minimize drag. This, then, also solves the high advancing tip velocity problem along with the retreating blade stall problem.

While any power source that can produce compressed gas will work, today's fanjet engines are the ideal means of providing compressed gas for tip-jet driven rotors. Gas is herein defined generally as any fluid with its molecules spaced further apart than that of a liquid. Tip-jets are generally defined herein as nozzles or orifices or exit apertures located somewhere along the rotor blades and directed rearward so as to expel sufficient gas at velocities to cause blade rotation about the rotor hub. The gas is warm at less than 300 degrees Fahrenheit and there is plenty of volume from a fan-jet engine. This system eliminates the need for burning high volumes of fuel at the tip-jets to obtain the required thrust.

A medium to high aspect ratio fixed-wing is used that will sustain the aircraft in the higher realms of forward flight; therefore, it has no need for the less efficient and massive contra-rotating rotors to solve the retreating blade stall problem. Also, sustaining the aircraft entirely on its fixed wings at high forward speed allows for slowing down the rotor, which prevents the advancing blade tip velocity from going sonic. It is important to note that, in any event, the rotor must be unloaded and slowed down for high speed forward flight or the forward speed will be severally limited by the high rotor drag as well as the advancing blade tip velocity. To permit this, and to prevent undue blade motion during forward flight, the rotor system is of the rigid type, meaning there are no hinged blades.

Figure 9:
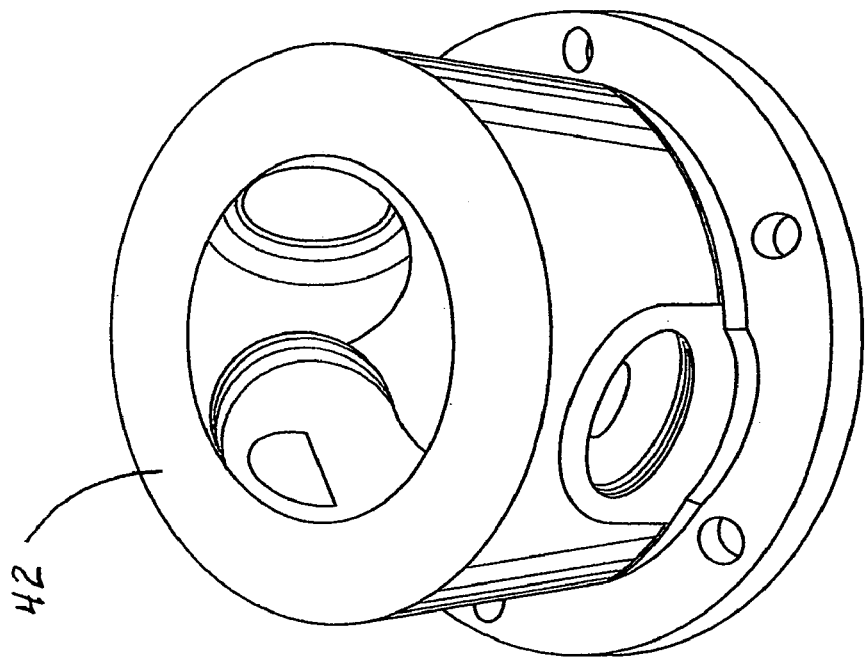
FIG. 9 is an isometric view of the manifold/impeller.

The compressed gas supply system ducting must be uniform and commensurate in cross-section with the volume of gas in any given part of the system. Thus, all ducting, valves and the mast must have uniform cross-sections. The gas pathways in the rotor blades themselves must also be uniform but will have a cross-section equal to that of the former divided by the number of blades. This insures continuous, maximum, undisturbed flow of compressed gas for maximum efficiency and immediate response to pilot input. The gas transition from the mast into the rotor blades takes place smoothly and efficiently via a manifold/impeller (as shown in FIG. 9) in the rotor head that impels and redirects the gas into the rotor blades just as an impeller does in a pump.

The present embodiment assembles a number of technologies into a harmonious, synergistic embodiment of a compound VTOL aircraft. The essence of this embodiment lies in the fact that it draws upon the most desirable features of these technologies, putting them together in a way that has not been done before, and, thus, obtaining results that have not been achieved before.

As shown in the drawings, a preferred embodiment of the present invention employs a high performance fuselage suitable for carrying four or five adults. A small wing is added that is highly efficient at over 200 mph. The wing is designed to have a wing loading of around 50 to 60 lbs/sq. ft. A 1500 lb thrust fanjet engine is then added with several valves to divert the hot exhaust gases to various nozzles or jets depending upon the need. When a gas-powered tip-jet driven, rigid, two bladed rotor assembly designed to pass through the mu-1 is added, the basic major components will have been assembled such that, when operated in the manner to be described, will yield the superior performing compound VTOL aircraft described herein.

As an example, a 4730 lb aircraft according to an embodiment of the present invention may be lifted with only 360 lbs. This equates to a thrust augmentation ratio of approximately 13.1.

Huge savings in heavy, expensive, bulky drive train parts could be realized if a tip-jet driven rotor is used. Furthermore an anti-torque device is not needed. In addition, blade roots can be substantially smaller and lighter because there is little to no torque involved.

Another potentially unexpected result might be that this system becomes more efficient the faster the rotor is turned, and with scimitar-tipped blades, it is possible to obtain a maximum effective tip velocity of about Mach 0.85. The efficiency and high rotor-tip velocity are facilitated by the rotor acting like a giant centrifugal compressor upon the gas mass inside it. Also note that the gas within a rotor blade becomes denser as the rotor load increases.

An important aspect of this aircraft is that has been designed to pass through the mu-1 barrier and cruise at a mu ratio of around two. This allows this aircraft to be able to achieve the speed and efficiency of many fixed-wing aircraft.

Another big advantage is that a much smaller fixed wing will suffice on this craft, as opposed to conventional fixed-wing aircraft, because the wing is not normally used for takeoffs and landings. Thus, profile drag drops significantly, yielding better efficiency and speed when up on the fixed wings. Another element that can be eliminated is the blade hinge. Because this aircraft will fly through mu-1, blade rigidity resulting from a lack of blade hinges may be desired for certain implementations. The rotor blades have elliptical cross-sections, such that, the leading and trailing edges are interchangeable. This reduces drag when there is reverse flow over the retreating blade. Combined, these features increase efficiency and speed of embodiments of the present invention over prior aircraft.

Finally, if requirements are such that a normal fixed-wing landing or take-off is necessary, both are easily accomplished. Furthermore, if an emergency landing is required, there is the option of either autorotation or a fixed-wing emergency landing.

In an illustrative operating scenario, a mode switch (not shown) is positioned in the VTOL takeoff position, and wing flaps are set at approximately 60 degrees. Throttle is applied by twisting. A VTOL mode LIFT control is then moved upward, which causes the aircraft to ascend. Stability and control is maintained as the aircraft is lifted off the ground with the help of a computer that controls reaction jets on the wing tips for roll. Reaction jets are included on either side of the aft fuselage for controlling yaw. Reaction jets are positioned above and below the jet exhaust nozzle for controlling pitch, as discussed more fully below. At approximately 50 to 100 feet, the pilot moves a VTOL—Forward-Flight control, thereby moving it out of the LIFT detent position. A main valve allows a little more gas to flow to a two-dimensional thrust nozzle. The aircraft then begins moving forward. Leading-edge flaps are then retracted, and the trailing edge flaps are reset from 60 to 30 degrees. Forward speed is increased until the wings begin to carry some of the load of the aircraft at approximately 60 knots. At approximately 100 knots, the wings provide the lift for the aircraft. At 100 knots, more exhaust gas is going out the jet exhaust nozzle 28 than is passing to the rotor. The rotor is then put into zero pitch and slowed down to approximately 150 rpm. Slowing the rotor down enables faster aircraft speeds before reaching a prohibitively high tip velocity on the advancing blade. In the present operative scenario, as the aircraft surpasses approximately 300 mph, the advancing blade tip velocity is only approximately 644 ft/sec, which is less than Mach 0.6. Note that as the rotor is slowed down, aircraft profile drag is reduced.

DESCRIPTION USING DRAWINGS

Figure 1:
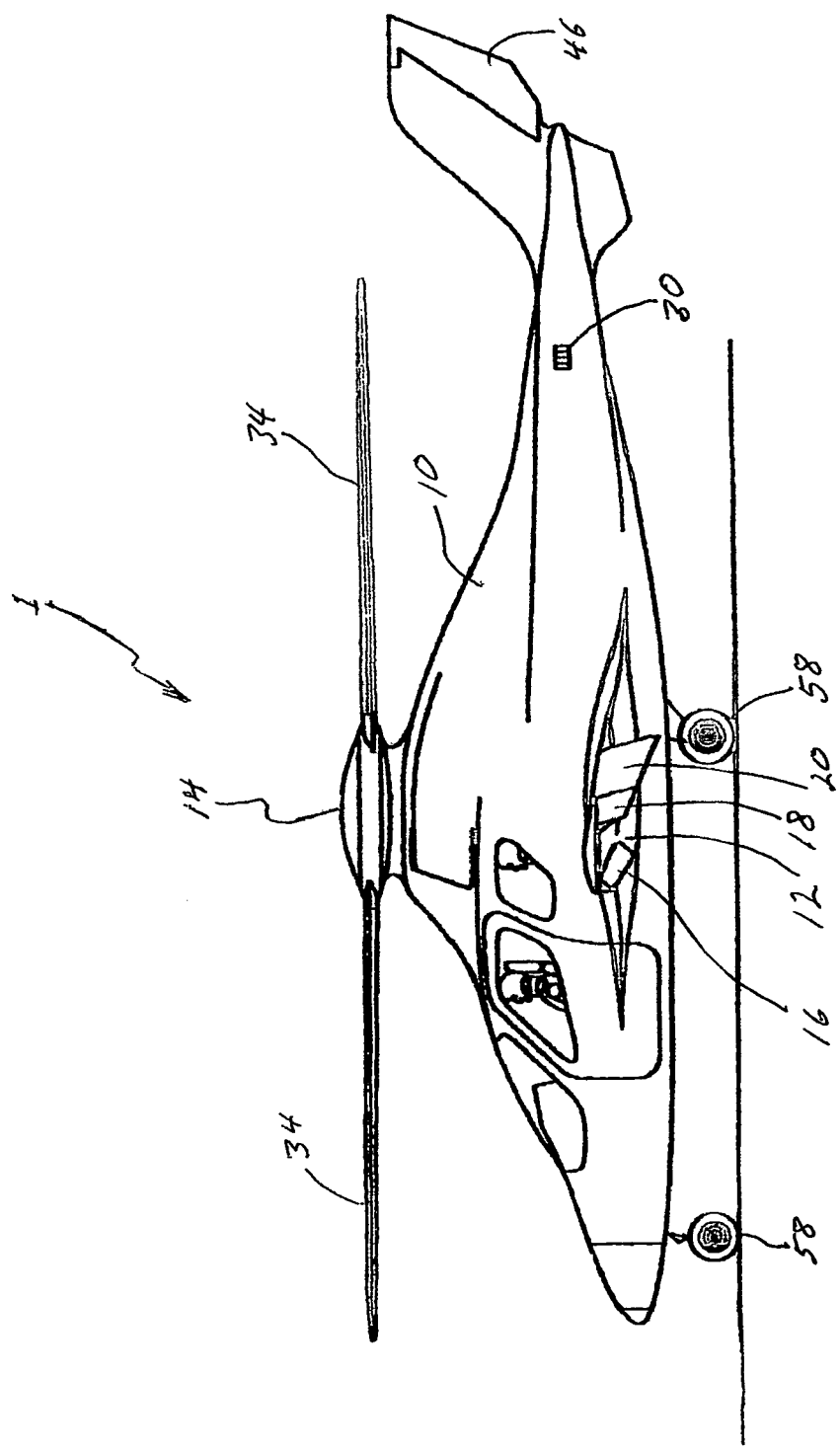
FIG. 1 is a side view of an aircraft in VTOL mode that is constructed in accordance with the teachings of the present invention.
Figure 2:
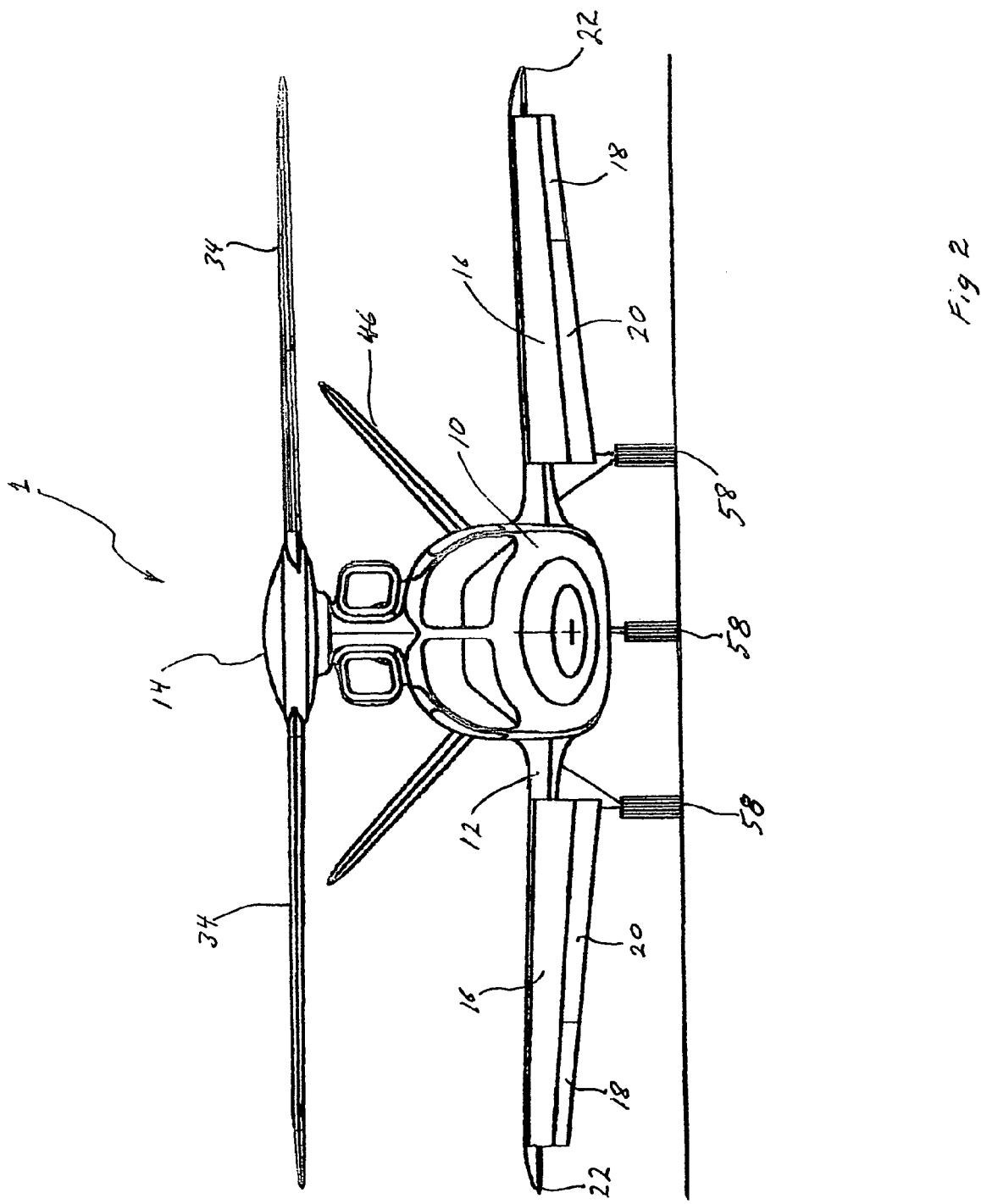
FIG. 2 is a front view of the aircraft of FIG. 1.
Figure 3:
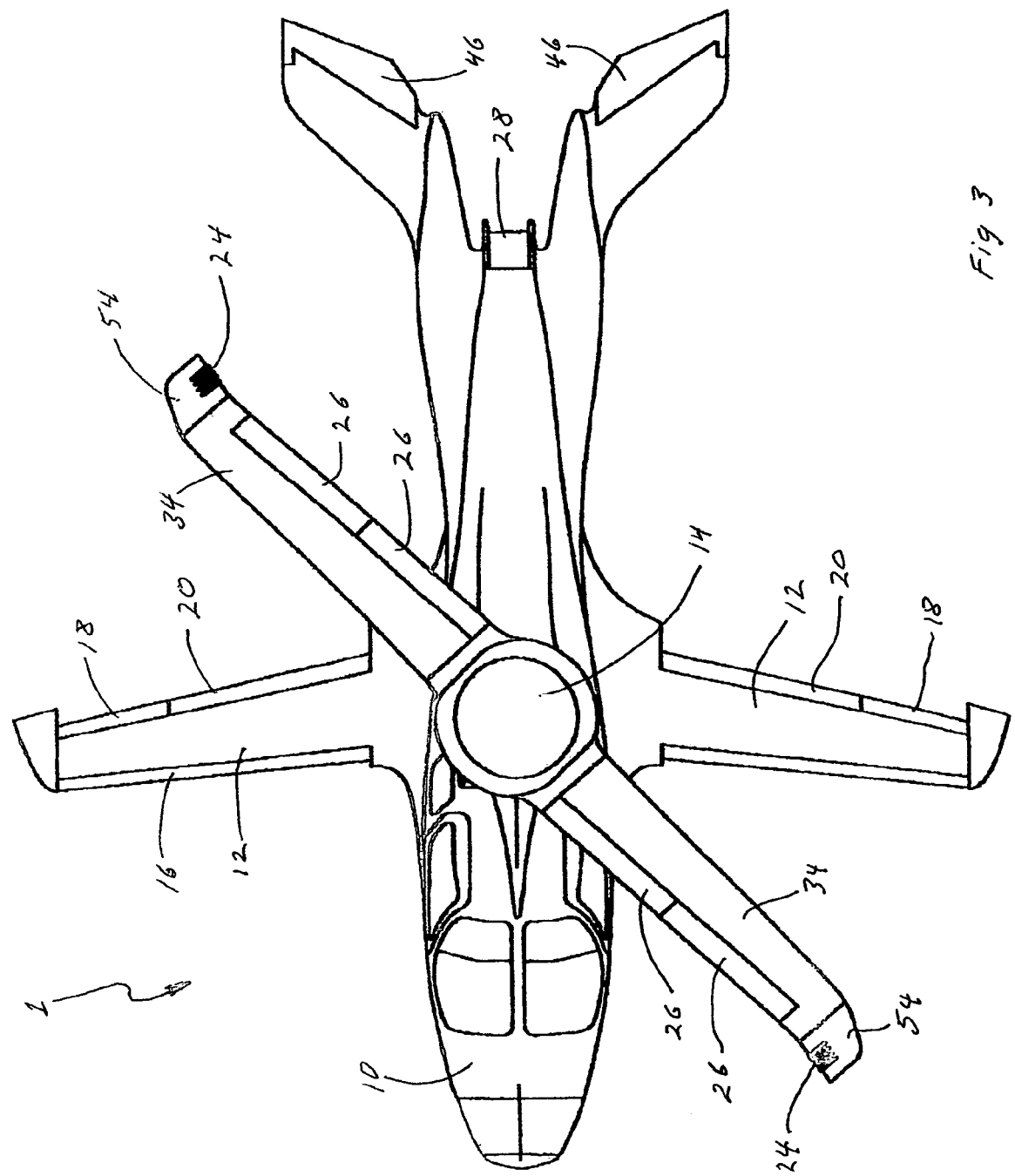
FIG. 3 is a top view of the aircraft of FIG. 1.

Referring to the 3-view drawings for the preferred embodiment, FIGS. 1, 2 and 3, aircraft 1 has an elongated fuselage 10. A forward swept wing 12 extends out equally from the lower portion of both sides of fuselage 10. Wing assembly 12 is shown with a pair of leading edge flaps 16, and trailing edge flaps 20, extended. Combination flaps and ailerons 18 are also shown extended. Side view, FIG. 1 shows one of two yaw reaction jets 30, an elevator/rudder 46, and landing gear 58. Front view, FIG. 2, indicates the location of roll reaction jets 22 beneath the tip of each half-wing.

Figure 10:
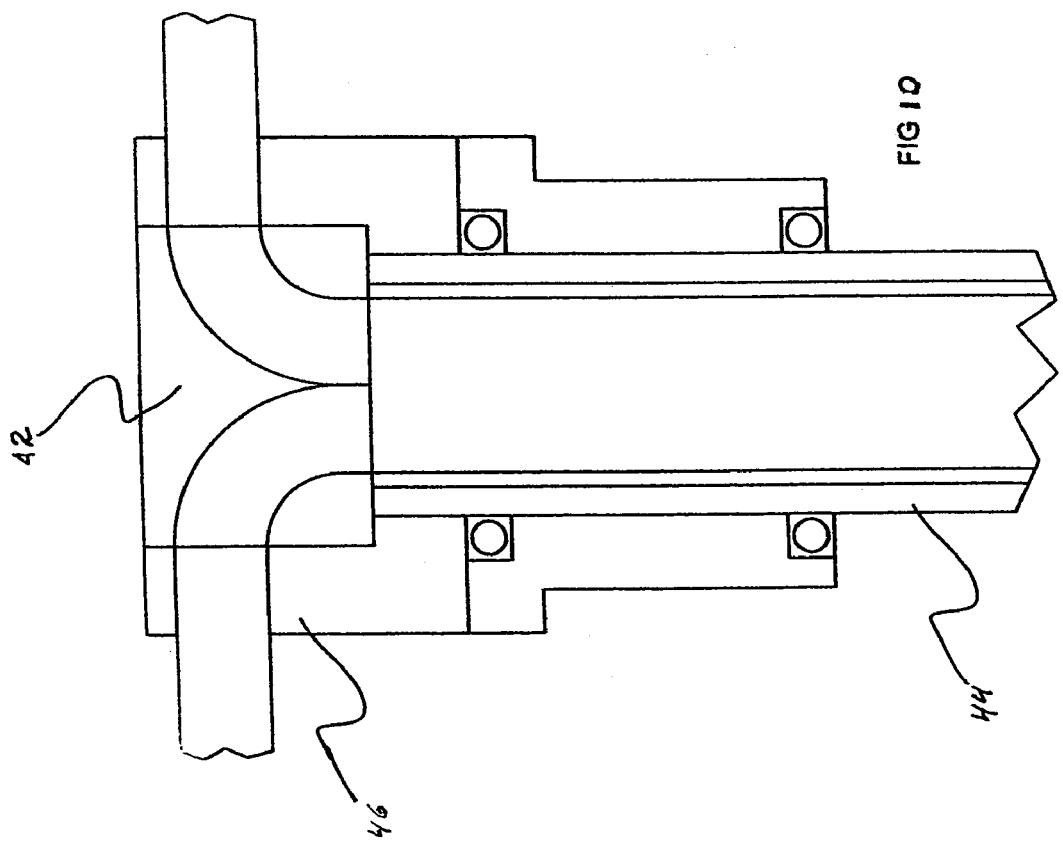
FIG. 10 is a mechanical drawing side view of the manifold/impeller within the rotary-wing hub.

FIGS. 1, 2 and 3 also show fuselage 10 has a rigid rotary-wing assembly 14 attached to its upper cg area. The rotary-wing assembly 14 being driven in VTOL and transition modes by compressed gas from a fanjet engine 42, shown in the aircraft phantom view in FIG. 4, and again schematically in FIG. 7, has a passage through a mast 50 that terminates at manifold/impeller 48 within hub assembly 52. See FIGS. 8 and 10.

FIG. 9 shows manifold/impeller 48 again in an oblique view. Blades 34 have an entrance and a path throughout their length that terminates at scimitar tips 54, each having a nozzle 24, seen in the top view, FIG. 3. The preferred embodiment of rotary-wing 14 has two blades 34. The trailing edge of each blade 34 is divided into two blade flap 26 sections, although, the new computer-controlled trailing-edge flap system actuated by embedded smart materials will not require this. If the embedded smart actuators are not available, more conventional high-rate computer-controlled actuators (not shown) will adjust each blade flap 26 independently to control the lift coefficient of each blade 34 area for any given flight condition.

Figure 4:
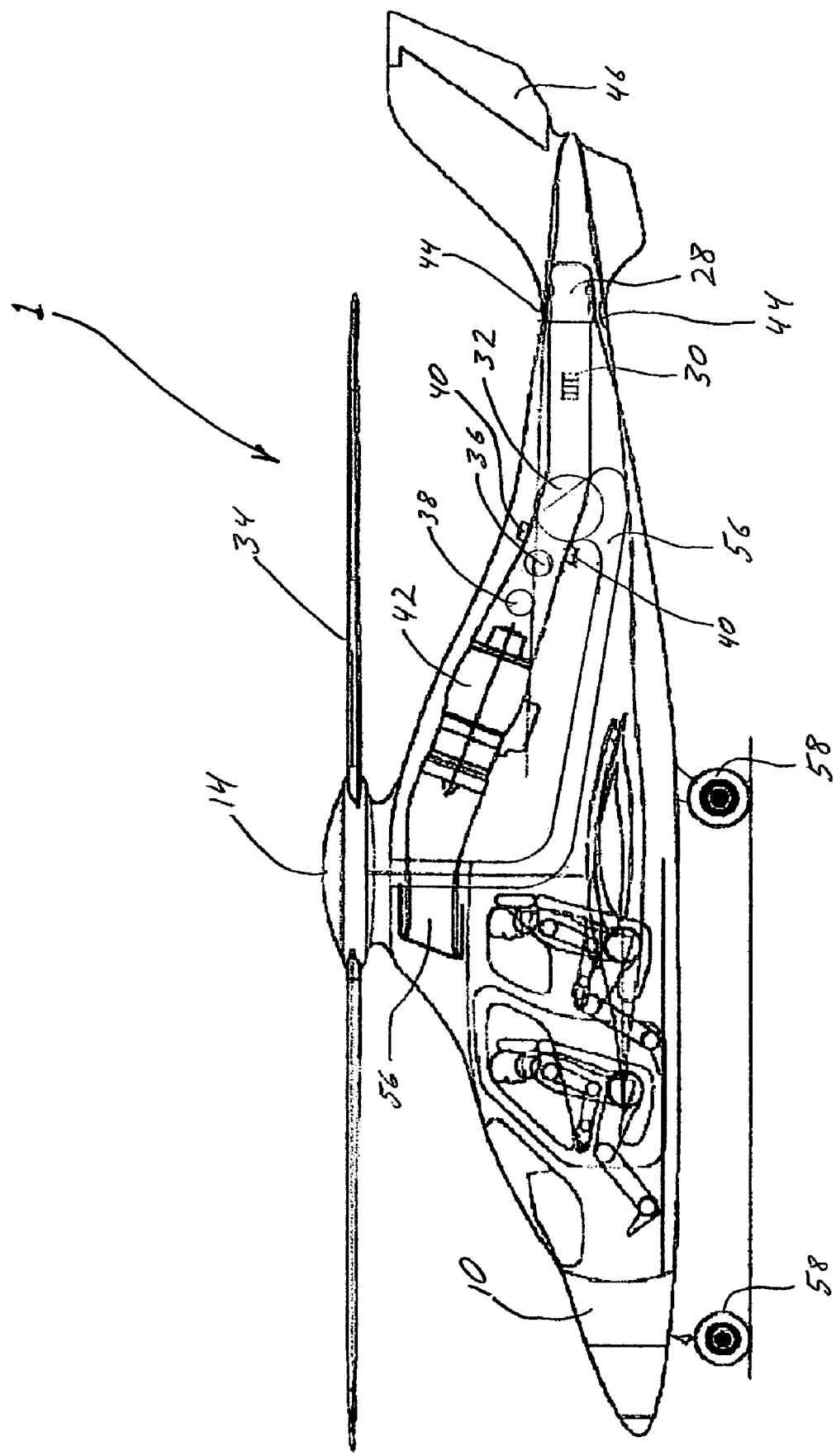
FIG. 4 is a side phantom view of the aircraft of FIG. 1 showing an engine and associated ducting.
Figure 5:
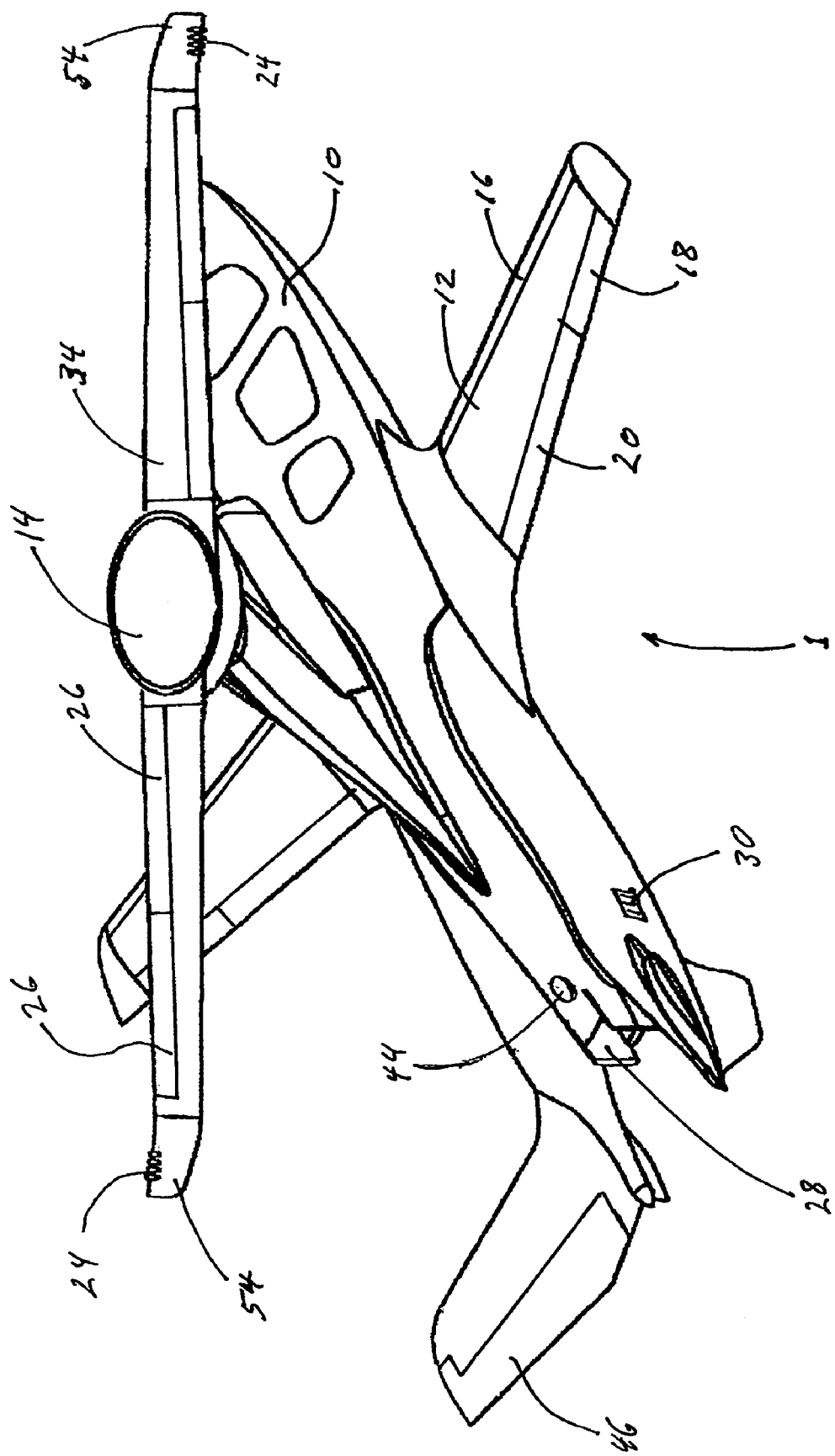
FIG. 5 is an oblique view of the aircraft of FIG. 1 shown in fixed-wing flight mode.

FIGS. 4 and 7 show engine 42 and ducting 56 for both intake gas and exhaust gases. FIG. 7 shows, schematically, a typical arrangement of the fanjet engine 42, ducting 56, and jet exhaust nozzle 28. Reaction jets 44U and 44D are for aircraft pitch control and are controlled by pitch valves 40U and 40D during VTOL and transition modes. A main gas valve 32 controls the mass flow between jet exhaust nozzle 28 and tip-jets 24. Also seen are yaw control valves 36R and 36L, and roll control valves 38R and 38L, both used for their respective purposes when in the VTOL and transition modes.

OPERATION

Aircraft 1, being a compound aircraft, has two modes of flight operation with a blending of the two during transition. Vertical takeoff is accomplished by first configuring aircraft 1 for VTOL operations by fully extending leading edge flaps 16, trailing edge flaps 20, and combination flaps and ailerons 18, and putting the mode switch (not shown) in the "VTOL Takeoff" position. The mode switch provides power to yaw valves 36, pitch valves 40, and roll valves 38 that control yaw reaction jets 30, pitch reaction jets 44, and roll reaction jets 22 respectively, as well as configuring computer 60 to control these jets, jet exhaust nozzle, and rotary-wing assembly 14. A VTOL mode Lift control with a twist grip throttle (not shown) operated by the pilot, much like a collective control in a helicopter, controls, with assistance from computer 60, rotary-wing 14 pitch and rpm. Another control (not shown) is marked "VOL"—"Forward Flight" and controls main gas valve 32 that switches compressed gases between rotary-wing tip-jets 24 and jet exhaust nozzle 28.

With the controls set for VTOL operations, and the Lift-control positioned for zero-pitch, the throttle is increased until rotary-wing 14 rpm is at takeoff rpm. The Lift control is then raised to begin increasing rotary-wing 14 pitch. Throttle is increased to maintain rotary-wing 14 rpm. Aircraft 1 becomes airborne as lift from the multiple-flow thrust generator rotary-wing 14 overcomes aircraft 1 weight. The pilot raises his landing gear 58. Computer 60 controls the reaction jets to maintain attitude and stability. After reaching 50 to 100 feet above ground level, the VTOL mode lift control and the forward flight control are adjusted to begin transition to forward flight. Compressed gases begin exiting jet exhaust nozzle 28, and aircraft 1 begins moving forward. Leading edge flaps 16 are retracted, and trailing edge flaps 20 along with combination flap and ailerons 18 are set from 60 to 30 degrees.

Computer 60 begins working blade flaps 26, which provide several functions. One, they provide the same function as flapping blades do on a helicopter by compensating for the unequal lift do to the higher velocity airflow over the advancing blade relative to the hub and retreating blade.

Two, as aircraft 1 passes through the mu-1 barrier a free-stream flow reversal occurs over the retreating blade, which blade flaps 26 correct for by inducing negative incidence on specific areas of blades 34. Note that retreating blade stall is not a problem because aircraft 1 will be flying on its fixed wing 12 before mu-1 is reached. In certain implementations, the rotary-wing may pass through an otherwise unsteady state, which is at least partially ameliorated via that blade flaps 26.

Three, since rotary-wing blades 34 are non-twisted, operation of blade flaps 26 provide the aerodynamic twist required to compensate for the variation in relative free-stream velocity across the imaginary disc created by the rotation of rotary-wing 14.

As forward speed increases, a pair of elevator/rudders 46 and combination flap and ailerons 18, all being flight control surfaces, begin to take effect so computer 60 begins to remove the reaction jets' affect from the control of aircraft 1. During this transition, the pilot is still in command by maintaining control of the throttle in one hand and main gas valve 32 "VTOL"—"Forward Flight" control in the other hand. Being jointly controlled by computer 60 and the Lift control, rotary-wing 14 pitch is eased into basically a zero pitch condition. Leading edge flaps 16, trailing edge flaps 20, and combination flap and ailerons 18 are retracted fully, and throttle is increased to provide the desired cruise or climb condition as forward speed increases. Rotary-wing 14 becomes unloaded and is slowed to around 150 rpm at approximately 100 knots. At this point aircraft 1 is sustained totally on fixed wings 12. An indicator light (not shown) comes on telling the pilot aircraft 1 has completed its transition. At this point the pilot switches the mode switch to "Fixed Wing Flight" and all is well until it is time to descend.

With the mode switch in the "Fixed Wing Flight" position, all reaction jets are turned off, and computer 60 now controls just rotary-wing 14 to maintain the correct rpm and desired effects of blade flaps 26 as discussed previously. All other aspects of aircraft 1 are now dealt with in the same manner as any other fixed-wing, fanjet propelled aircraft.

When the pilot has eased the throttle and slowed aircraft 1 to about 120 knots in preparation for a VTOL landing, he will drop his landing gear 58 and put the mode switch into the "VTOL Landing" position. He will continue slowing aircraft 1 and extend the leading edge flaps 16, trailing edge flaps 20, and combination flap and ailerons 18 to 30 degrees at 100 knots. He now begins to slowly come back on the "VTOL"—"Forward Flight" control into the VTOL position. When he reaches his desired rate of descent, he will maintain it by adding rotary-wing pitch with his VTOL mode Lift control. The reaction jets controlled by computer 60, once again help maintain attitude and stability, although the pilot still maintains ultimate control with his control surface controls. Computer 60 again recognizes the affect the reaction jets have relative to control surfaces and makes the appropriate adjustments to yaw 36, roll 38 and pitch 40 control valves. Below 60 knots, aircraft 1 is fully in the VTOL mode so the pilot controls aircraft 1 with the controls previously mentioned that are in his left and right hands. As aircraft 1 is slowed to approximately 25 knots the pilot fully extends leading edge flaps 16, trailing edge flaps 20, and combination flap and ailerons 18 to 60 degrees. When aircraft 1 is within ground effect, the pilot eases rotary-wing 14 pitch and throttle to complete his vertical landing. Once he is back on the ground, he can taxi by providing some thrust with main gas valve 32 controlled by his left hand.

CONCLUSION, RAMIFICATIONS, AND SCOPE

There has been a long felt need to have a VTOL aircraft that can fly over 300 mph. This has only been achieved so far by the military's V-22 Osprey and the AV-8 Harrier. When aircraft cost versus useful load or operating costs versus useful load are considered, neither can meet the high standards of this preferred embodiment, which will fly over 300 mph.

Most VTOL aircraft still use shaft driven rotors. Those few that do not are either gyrocopters that provide no means of directly propelling the rotor in flight, or aircraft that do have other means of propelling the rotor but have not shown an assembling of a combination of the properly designed elements to accomplish what certain embodiments of the present accomplish. None have transited the mu-1 barrier.

To summarize, the preferred embodiment has been designed to enjoy the many benefits of flying beyond the mu-1 barrier. The rotary-wing is idled and unloaded, and a medium to high aspect ratio, medium to highly loaded fixed-wing is employed to sustain the aircraft during the higher speeds of forward flight. By doing this and utilizing a uniquely designed rotary-wing with segregated flaps in accordance with the present teachings, retreating blade stall, high tip velocity, high rotary-wing drag, equalization of lift across the rotary-wing disc, air flow reversal across retreating blade, and mu-1 transition problems are solved.

A multiple-flow thrust generator is used to obtain a thrust augmentation ratio of greater than 10. The multiple-flow thrust generator includes a gas-powered tip-jet driven rotary-wing, which provides lift when the aircraft is in the VTOL and transitional flight modes.

The rotary-wing has collective pitch control. Its blade root sections are small and lightweight compared to shaft-driven counterparts. Attitude about the yaw and roll and pitch axes are maintained with reaction jets. Uniform cross-section ducting are combined with necessary gas valves, blade cross-sections elliptically shaped, other necessary control surfaces, and a manifold-impeller in the rotary-wing hub for efficient transition of gas flow into the blades. Other operational functions include operating the rotary-wing at high rpm and loads for better efficiency when in VTOL and transitional modes, fore and aft fixed-wing flaps to reduce wing print under the rotary-wing and to achieve transition at a lower forward speed, and dump and capture valves, if necessary, as a means of controlling temperature, pressure and volume of the compressed gases.

When a sleek, high performance body is added, the compound aircraft of the preferred embodiment has various previously unforeseen advantages, including:

1. economy of operation,
2. economy of maintenance,
3. large reduction in weight,
4. large reduction in initial cost,
5. increased payload,
6. increased range,
7. increased performance,
8. built in rotor de-icing capability,
9. no shafting, clutches or transmissions required,
10. gains in efficiency result as rotor load and rpm increase,
11. does not require a large, heavy blade root section to carry the load from the shaft as in shaft driven rotors,
12. better aerodynamic designs, (The aircraft can be designed from a purely aerodynamic and cg/balance point of view. There need be no consideration given to locating the engine(s) with respect to the drive train or rotors.)
13. a huge thrust augmentation ratio, and
14. no need for an anti-torque device, such as a helicopter tail rotor.

An object of the present invention is to provide a gas-powered tip-jet-driven compound VTOL aircraft that will bring about the realization of the fourteen enumerated benefits listed above.

While the above description contains many specificities, these should not be construed as limiting the scope of the invention, but rather as an exemplification of a preferred embodiment thereof. Many other variations are possible. For example, any fixed wing that will sustain the aircraft is suitable. There are various engine options that can be used, such as pure turbine engines or reciprocating engines combined with a blower or compressor, or two engines of the same or different types could be used rather than providing the main gas valve of the preferred embodiment. Forward flight propulsion could also be by propeller rather than jet exhaust, or it could be by a combination of the two. A propeller, if used, could be shaft driven or driven by tip-jets. VTOL attitude control could also be by other means, such as extra control surfaces for use during slow speed maneuvers, or small fans at points on the aircraft that would adequately control attitude around the yaw, pitch and roll axes; or even a combination of various means could be used. The multiple-flow thrust generator can utilize any combination of propulsive means for the tip-jets, such as ramjets, pulsejets, rockets, or compressed air that is ignited with fuel at the tip-jets.

Means other than segmented flaps for rotor dynamics could be similar to the two-bladed flex-beam rotor type depicted in U.S. Pat. No. 6,024,325, which could be operated by high rate actuators in a cyclic fashion, but would be used for the identical purpose as are the segmented flaps of the preferred embodiment except that they might also be used for collective pitch control. Another method includes use of smart rotor blades using aeroservoelastic structures such as piezoelectric actuators embedded into the rotor blades themselves or for actuating blade flaps that effectively control twist, blade pitch, and vibration and the dynamic effects due to flying beyond mu-1.

The three-position mode switch, whose functions were addressed in the "operations" part of the "detailed description of preferred embodiment" section, may be replaced by computer logic. These are all ramifications of the invention as claimed.

Accordingly, the scope of the invention should be determined not by the embodiment illustrated, but by the appended claims and their legal equivalents.

I claim:

1. A compound aircraft comprising:
an engine;
first means for propelling the aircraft in flight, wherein the first means includes:
    ducting and valves for passage and control of compressed gases derived from the engine and
    a gas-powered tip-jet driven rotor system having one or more blades to which the compressed gases are delivered;
second means for controlling and stabilizing the rotor system under flight conditions above and below Mu-1; and
a fuselage coupled to the engine and the first means.

2. The compound aircraft of claim 1 further including:
a computer for operating one or more flaps, wherein the one or more flaps are affixed to one or more of the one or more rotor blades, and wherein the computer includes one or more instructions for:
stabilizing the tip-jet driven rotor system when the tip-jet driven rotor system encounters variations in freestream air velocity and
compensating for changes in airflow across the tip-jet driven rotor system to facilitate surpassing the mu-1 barrier.

3. The compound aircraft of claim 1 further including:
high-rate actuators that are operable in a cyclic fashion to facilitate controlling the tip-jet driven rotor system, including facilitating collective pitch control of the tip-jet driven rotor system.

4. The compound aircraft of claim further including:
one or more aeroservoelastic structures coupled to or embedded in one or more of the blades, wherein the one or more aeroservoelastic structures are adapted to facilitate controlling blade twist, blade pitch, and blade vibration.

5. The compound aircraft of claim 1 wherein the one or more aeroservoelastic structures include one or more piezoelectric actuators.

6. The compound aircraft of claim 1 wherein one or more tips of the one or more blades are curved or rounded.

7. The compound aircraft of claim 1 wherein the ducting extends to reaction jets in the wing, wherein the reaction jets are adapted to facilitate controlling roll of the compound aircraft, and wherein the ducting is adapted to provide de-icing capability for the wing and the one or more blades.

8. The compound aircraft of claim 1 further including:
a jet exhaust that exits through an exhaust nozzle, wherein the jet exhaust originates from the engine and is selectively diverted to the exhaust nozzle via the ducting and valves, and wherein the exhaust nozzle is directed aft of the compound aircraft to facilitate providing forward propulsion to the compound aircraft.

9. The compound aircraft of claim 1 further including:
a manifold within or coupled to a hub of the tip-jet driven rotor system.

10. The compound aircraft of claim 1 further including:
one or more leading-edge and trailing-edge flaps affixed to the wing, wherein the one or more leading-edge and trailing-edge flaps are adapted to facilitate transitioning between flight modes.

11. The compound aircraft of claim 1 further including:
one or more reaction jets for controlling the attitude of the compound aircraft around pitch and/or roll axes.

12. The compound aircraft of claim 1 wherein cross-sections of the blades are approximately elliptically shaped.

13. The compound aircraft of claim 1 further including
a rearward or forward facing propeller for propelling the compound aircraft in forward flight.

14. The compound aircraft of claim 13 wherein the propeller is tip-jet driven.

15. The compound aircraft of claim 1 wherein the rotor system includes one or more rotor blades which do not stop moving during flight.

* * * * *